United States Patent [19]

Weston

[11] 4,272,029

[45] Jun. 9, 1981

[54] UPGRADING OF BAUXITES, BAUXITIC CLAYS, AND ALUMINUM MINERAL BEARING CLAYS

[75] Inventor: David Weston, Toronto, Canada

[73] Assignee: Reynolds Metals Company, Richmond, Va.

[21] Appl. No.: 14,279

[22] Filed: Feb. 23, 1979

Related U.S. Application Data

[63] Continuation-in-part of Ser. No. 838,445, Oct. 4, 1977, Pat. No. 4,193,791, which is a continuation-in-part of Ser. No. 736,466, Oct. 28, 1976, Pat. No. 4,113,466, and Ser. No. 115,397, Jan. 24, 1979.

[51] Int. Cl.³ .................... B02C 23/08; B03B 1/04
[52] U.S. Cl. .......................... 241/16; 209/3; 209/38; 209/214; 241/24
[58] Field of Search .................. 209/3, 4, 9, 5, 38, 209/39, 213, 214; 75/1 R, 219; 423/80, 113; 241/20, 24, 16; 106/72, 780 B

[56] References Cited

U.S. PATENT DOCUMENTS

| | | | |
|---|---|---|---|
| 1,063,893 | 6/1913 | Schweiin | 209/5 X |
| 1,397,414 | 11/1921 | Everhart | 209/5 |
| 2,352,324 | 6/1944 | Hubler | 209/39 X |
| 2,394,578 | 2/1946 | Wulff | 209/5 X |
| 2,428,228 | 9/1947 | Keck | 209/5 X |
| 2,535,647 | 12/1950 | Millman | 106/72 |
| 2,964,383 | 12/1960 | Kawlet | 423/113 X |
| 3,045,822 | 7/1962 | Cavanaugh | 209/219 |
| 3,198,622 | 8/1965 | Herzog | 75/1 R |
| 3,439,803 | 4/1969 | Duval | 209/214 X |
| 3,471,011 | 10/1999 | Iannicelli | 209/214 |
| 3,482,685 | 12/1969 | Malden | 209/5 |
| 3,489,514 | 1/1970 | Slatin | 423/113 |
| 3,589,622 | 4/1970 | Weston | 209/5 |
| 3,765,921 | 10/1973 | Puskar | 106/72 X |
| 4,113,466 | 9/1978 | Weston | 209/166 X |

FOREIGN PATENT DOCUMENTS

| | | | |
|---|---|---|---|
| 623282 | 7/1961 | Canada | 209/214 |
| 563095 | 7/1944 | United Kingdom | |

OTHER PUBLICATIONS

Obogashcheniye boksitor, Moscow, 1970 pp. 59–91.
U.S. Bu of Mines, RI No 6914, 1967, 18 pages.

*Primary Examiner*—Robert Halper
*Attorney, Agent, or Firm*—Glenn, Lyne, Girard & McDonald

[57] ABSTRACT

A process for the upgrading of aluminum mineral bearing raw materials by using at least three beneficiation treatment stages consisting of dispersion of a pulp of the material in specific pH ranges, screening in specific mesh sizes, and using at least one stage of high intensity magnetic separation.

65 Claims, 4 Drawing Figures

UPGRADING OF BAUXITES, BAUXITIC CLAYS, AND ALUMINUM MINERAL BEARING CLAYS

BACKGROUND OF THE INVENTION

This invention is a continuation-in-part of my pending U.S. Patent Application Ser. No. 838,445, filed Oct. 4, 1977, now U.S. Pat. No. 4,193,791, which is a continuation-in-part of Ser. No. 736,466, filed Oct. 28, 1976, now U.S. Pat. No. 4,113,466, granted Sept. 12, 1978, and my pending U.S. Patent Application Ser. No. 115,397, filed Jan. 24, 1979.

This invention is primarily applicable to the upgrading of bauxites, bauxitic clays, and aluminum mineral bearing clays. The conventional method used for the upgrading of bauxites; reference American Institute of Mining and Metallurgical Engineers, technical paper by Alcan International personnel presented at the 1977 Annual Meeting, Atlanta, Ga., Mar. 6-10, 1977; is to first crush the raw material to a specific size, normally three inches, followed by wet screening at 20 mesh Tyler, retaining the plus 20 mesh size fraction as the upgraded bauxite, and the minus 20 mesh portion is rejected as waste. The upgrading in this case is mainly to reduce the silica in the plus 20 mesh product together with some removal of the iron and titanium minerals. The amount rejected as waste is usually a minimum of 40 percent of the original feed material and contains a relatively high percentage of the desirable aluminum bearing minerals which have the chemical analysis of $Al_2O_3 \cdot xH_2O$. In the treatment of clays, in which one of the main uses is for the refractory industry, to the knowledge of the inventor, the only major upgrading that is done on a commercial basis is the use of high magnetic intensity separators using steel wool as the magnetic media primarily for the reduction of the iron content of the raw material. Such magnetic separators are of the type manufactured by the Sala Company of Sala, Sweden. In using steel wool as a magnetic media, the product must be reduced in size to essentially minus 10 microns, which is difficult and expensive; otherwise any granular material essentially coarser than 10 microns hangs up in the steel wool and entails large losses of the desirable portion of the raw material. In addition, only small amounts of magnetically susceptible material can be economically removed due to the limited amount of magnetics that can be held by the steel wool or alternately, only small tonnages of material can be treated by such a high-intensity magnetic unit entailing high capital costs per ton of material treated.

In applying my invention to the upgrading of bauxites, and by the use of a number of low cost beneficiation stages, I have been able to use a high intensity magnetic separator of the Jones type which entails the use of no specific type of magnetic media such as steel wool, allowing me to remove large quantities of magnetically susceptible minerals and in particular iron and titanium minerals from the original feed material at a comparatively low cost. Further, if necessary, I use a desliming stage at preferably 2.0 to 10.0 microns, the combination of which upgrades the original bauxite to an appreciably higher grade than was heretofore possible by the elimination of large amounts of the iron and titanium minerals together with silica, resulting in an appreciably higher grade bauxite than was heretofore economically possible together with an appreciable increase in recovery of the desirable $Al_2O_3 \cdot xH_2O$ minerals, where x is the amount of water chemically combined with the $Al_2O_3$.

In the treatment to upgrade clays, I use a number of novel low cost beneficiation steps including the Jones type magnetic separator, to remove a major portion of the iron and titanium minerals with but minor losses of the desirable aluminum bearing minerals, which in this case are normally predominantly Kaolinite, of which the chemical analysis is $Al_2O_3 \cdot 2SiO_2 \cdot 2H_2O$.

SUMMARY OF THE INVENTION

It is accordingly a primary object of the present invention to provide a novel process for the upgrading of bauxites by reducing at least the iron and titanium content of the original material and in most cases, also the percentage of silica. It is a further object of the present invention to provide a novel and low-cost process for the upgrading of bauxitic clays and clays to produce a product that is appreciably lower in iron and titanium analysis than the original feed material together with comparatively low losses of the desired contained aluminum bearing minerals. Other objects and advantages of the claimed invention will become apparent as the description thereof proceeds.

In satisfaction of the foregoing objects and advantages there is presented by this invention in its broadest concept a process for the upgrading of bauxites, bauxitic clays, and clays in which at least the iron and titanium minerals are appreciably reduced, and in the case of the bauxites, the silica content is also appreciably reduced, the process comprising:

(a) Preparation of the raw material—in the treatment of raw materials such as bauxite and bauxitic clays, the normal circuit will consist of crushing to a sufficiently small feed size suitable for further reduction in such comminution units as a rod mill or ball mill. Such feed size will normally be minus ¾ inch. In my preferred circuit, I use a pulp density for at least one wet grinding stage of 40 to 55 percent solids and maintain the pH at the discharge of the said at least one wet grinding stage of at least 8.5, using at least sodium hydroxide as the alkaline agent. Where I use NaOH as the alkaline agent along or in combination with other alkaline agents selected from the group consisting of KOH, NH4OH, and Na2CO3, my pH range is about 9.5 to about 12.5. Where I use at least NaOH as the alkaline agent in combination with a dispersing agent selected from the group consisting of lignins, silicates, and phosphates, my pH range in the at least one wet grinding stage is in the pH range of about 8.5 to 12.5. By this means I obtain controlled dispersion of the solid particles in the pulp which results in high efficiencies of grinding by being able to operate at a comparatively high pulp density level, resulting in low power consumption and excellent liberation characteristics of the various contained minerals, again which results in the ability of the subsequent high intensity magnetic stage to remove a large percentage of the magnetically susceptible iron and titanium minerals with a comparatively low loss of the aluminum bearing minerals which are nonmagnetic.

In treating such raw materials as clay, which may contain only small amounts of coarse material or a negligible amount, I prefer to form a pulp of the original material in the pulp density range of about 10 percent solids to about 55 percent solids using at least sodium hydroxide as the alkaline and dispersing agent and controlling the pulp pH in the range of about 9.5 to 12.5, or alternately, as noted above, using sodium hydroxide either in combination with other alkaline agents or sodium hydroxide alone in combination with dispersants, or alternately, sodium hydroxide in combination with other alkaline agents and dispersants.

(b) Following the at least one wet grinding stage, I prefer to screen the material to within the range of 10 mesh to 65 mesh Tyler. The oversize fraction from the screening operation may either be sent to waste which would normally consist of wood contained in the original material or alternately return part or all of the oversize fraction to the at least one wet comminution stage. The mesh size that I use in this stage will be dependent upon the subsequent processing steps. If I use a low to medium high magnetic separation step in which the magnetic separators are of the conventional drum type using either permanent or electromagnetics in which the magnetic field strength is in the range of about 0.5 to 10.0 kilogauss, my preferred screen size is in the range of about 10 to 35 mesh. Further, I may omit any screening stage prior to such magnetic cobbing.

If the screen undersize is fed directly to my at least one high magnetic intensity separation stage, my preferred screen size is about 20 mesh to 65 mesh Tyler.

If I subsequently use a desliming step prior to any magnetic separation, I may use one or more screening stages prior to or after desliming.

(c) High intensity magnetic separation stage—in this stage I prefer to use a pulp density of about 15 percent to 45 percent solids maintaining the pH of the pulp with at least an alkaline agent and in the pH range of 8.5 to 12.5.

In applying my invention to bauxites, I prefer to follow this stage with a desliming step.

(d) Desliming—in the simplest application of the invention, I prefer to deslime the material at a particle size of about 2 to about 10 microns using conventional equipment such as thickener-sizer separators, hydroseparators, or centrifugal separators, all well known in the art. The minus fraction from such treatment will normally contain a much higher percentage of the silica than in the original material together with appreciably higher amounts of both iron and titanium minerals than was contained in the original material, thus upgrading the plus fraction which will be impoverished in iron, titanium, and silica than was present in the original feed material.

Prior to such desliming, I may remove a coarser fraction from the material prior to such treatment by using one or more stages of cyclones in which the plus fraction may be as coarse as essentially plus 200 mesh while the essentially minus 200 mesh fraction is feed to the above described desliming stage.

In the application of the invention to clays, I do not normally use the desliming stage as the losses of the desirable aluminum bearing minerals are too high to be economically feasible.

(e) In the case of the bauxites, following the desliming stage, I prefer to treat at least the plus fraction in at least one additional high magnetic intensity step using the Jones type separator and magnetic field strength in the range of about 11.0 to 22.0 kilogauss. Dependent on the economics, I may also use the steel wool type magnetic separator on the minus 2 to about minus 10 mesh fraction to remove residual iron and titanium and combining this nonmagnetic fraction with the nonmagnetic fraction from the plus portion of the separation, or alternatively, this minus fraction may be fed to such a process as the Bayer Process for the aluminum mineral recovery or alternately, have commercial value in the aluminum chemical products industry.

The following will define for clarity various terms used in describing the invention:

Magnetic Cobbing—passing a prepared pulp of the material through a magnetic field to remove from the material a magnetic concentrate containing a large percentage of the iron and titanium minerals which is rejected as waste, and nonmagnetic product that analyzes appreciably lower in iron and titanium than the original feed material, and containing a high percentage of the original aluminum minerals contained in the material.

Desliming—separation of the fine particles of the prepared material from the coarser fraction.

In the practice of my invention this separation is usually carried out at 2.0 to 10.0 microns, with the minus fraction to waste or some other use such as the Bayer Process, and the plus 2.0 to plus 10.0 microns as the retained product for subsequent processing or commercial use. This desliming step is only carried out where a relatively high percentage of the iron and titanium minerals in the minus 2.0 to minus 10.0 micron sized ranges will not respond to high magnetic intensity cobbing and the loss of aluminum minerals in this product is either economically acceptable, or that little or no loss of the aluminum minerals takes place where such product can be economically fed to a Bayer Process.

Bauxites and bauxitic clays—there is a thin line in these definitions. The difference between bauxites and bauxitic clays is essentially the percentages of $Al_2O_3.xH_2O$ minerals contained in the materials. Where practically all of the silica in these materials is present as Kaolinite, the relative percentages of silica are taken as the definitive separation point.

For instance, Arkansas bauxites can be defined as containing approximately less than 16 percent $SiO_2$, and Arkansas bauxitic clays, more than 16 percent $SiO_2$.

Clays—generally refer to materials containing little or no $Al_2O_3.xH_2O$ minerals and the major aluminum mineral component is essentially kaolinite, $Al_2O_3.2SiO_2.2H_2O$.

Alumina—$Al_2O_3$.

Iron and titanium—the standard practice of the aluminum industry is to report Fe and Ti analyses as $Fe_2O_3$ and $TiO_2$. The iron and titanium minerals contained in the aluminum bearing materials vary considerably and are but rarely only in the form of $Fe_2O_3$ and $TiO_2$. For instance, the major iron mineral in Arkansas bauxite is siderite, $FeCO_3$, and the commonest occurring form of titanium is as ilmenite, $FeOTiO_2$. When I refer to percentages of $Fe_2O_3$ and $TiO_2$ herein, I mean the chemical analyses as Fe and Ti converted to $Fe_2O_3$ and $TiO_2$, respectively.

Alkaline agent—an agent used to raise or maintain the pH of the pulp within certain optimum pH ranges. The alakline agents that may be used in this process are alkaline dispersing agents selected from the group consisting of sodium hydroxide, potassium hydroxide, ammonium hydroxide, sodium carbonate, and mixtures thereof as described herein.

Dispersing agents—families of dispersants such as lignins, phosphates, silicates, or any other family of specific dispersants which may be economically used to disperse the solids contained in the pulp of the raw material, and which, in combination with at least one alkaline agent, sodium hydroxide, in specific pH ranges, combines to result in the unique and outstanding metallurgical results in removing iron and titanium minerals from the material by high intensity magnetic separation.

In combining one or more dispersing agents with at least sodium hydroxide as the alkaline agent I have found that for optimum results in removing iron and titanium minerals from the feed material by high intensity magnetic separation, I require the pH of a pulp of the material to be raised to at least 8.5 using at least sodium hydroxide as the alkaline agent and preferably at an optimum pH point in the range of 9.5 to 12.5.

DESCRIPTION OF THE PREFERRED EMBODIMENTS

In the use of high intensity magnetic separation as the first major process step in removing a high percentage of the contained iron and/or iron and titanium from the feed material, the preparation of the feed material prior to the magnetic separation circuit is important.

If the original feed material is too coarse a size as feed to a comminution unit such as a rod mill or ball mill, I firstly crush and if necessary screen and feed material to the appropriate size and feed it to at least one stage of wet grinding. To this at least one stage of grinding I add at least sodium hydroxide as a combined alkaline and dispersing agent, controlling the pH of the pulp discharge from the grinding unit preferably within the pH range of 9.5 to about 12.5. If I combine dispersing agent with at least NaOH as the alkaline agent I may reduce the lower end of the pH range to about 8.5. By this means I obtain high efficiency in my grinding circuit using pulp densities as high as 60 percent solids, with good liberation of the magnetically susceptible minerals, and in particular, the iron and titanium minerals.

Without the above noted use of alkaline agents either alone or in combination with dispersing agent, it would be impossible to operate at such high densities with many of the aluminum bearing materials.

My preferred range of pulp density in the at least one wet grinding mill is 45 percent to 55 percent solids.

Following the at least one wet grinding mill I prefer to dilute the pulp to 15 percent to 45 percent solids dependent on the pulp density I subsequently use to the first stage of high intensity magnetic separation. Following the dilution of the pulp I prefer to screen the solids using one or more screens in the range of 20 to 65 Tyler mesh. The oversize from the screening circuit may be sent to waste containing mostly wood which occurs with the feed material, or alternately part or all of the oversize can be returned to the wet grinding circuit.

The undersize may be fed as is or further diluted to the at least one stage of high intensity magnetic separation.

My preferred range of pulp densities to this stage is in the range of about 15 to 45 percent solids. I prefer to use at least two stages of high intensity magnetic separation. The magnetic concentrate or concentrates may be sent to a thickener or tailings pond where the solutions are recovered and recirculated to the magnetic or grinding circuits, or alternately, the thickener underflow containing the magnetic concentrate or concentrates reground to liberate further aluminum bearing minerals which may be recovered by an additional stage or stages of magnetic separation treatment.

Following the magnetic circuit the nonmagnetic fraction of the feed material may be sent to a thickener, followed by a filter or other means of bulk solution removal such as centrifugal separator, and the filter cake or centrifugal cake sent to storage for partial air drying prior to drying and/or dehydration or directly to dehydration. Alternately, the nonmagnetic fraction may be subjected to a desliming operation using conventional equipment such as cyclones, hydroseparators, and thickening-sizer apparatus such as is used in iron ore beneficiation and well known in the art.

I only use a desliming circuit where substantial amounts of iron occur in the minus 2.0 to minus 10.0 micron size range and which iron-bearing minerals do not effectively respond to my magnetic separation circuit. Further, this desliming circuit involves a loss of some of the aluminum bearing minerals, and if such loss is too high it precludes the use of this circuit. If the losses in aluminum bearing minerals is within acceptable economic limits, or the contained aluminum bearing minerals can be used and treated in other processes such as the Bayer process, then there is economic justification for the use of this desliming circuit in treating specific materials.

There is a third alternative in treating the deslimed fraction of the feed material and that is feeding it to a magnetic cobbing circuit using a minimum field strength of 16.0 kilogauss and preferably in the range of about 18.0 to about 22.0 kilogauss. This high magnetic intensity field combined with a special design of magnetic media such as the Colbourn magnetic separator using steel balls, or the Sala type magnetic separator using steel wool, may remove sufficient of the contained iron and/or iron and titanium minerals to economically justify such a magnetic circuit with the nonmagnetic fraction combined with the nonmagnetics from the plus 2.0 to plus 10.0 micron sized fraction.

Following the desliming circuit, I may or may not use a further stage of high intensity magnetic separation on the plus 2 to plus 10 micron sized fraction. The use of such an additional stage is dependent upon the amount of residual magnetically susceptible iron and/or iron and titanium minerals that can be removed and the economics of adding such a stage to the overall circuit.

BRIEF DESCRIPTION OF THE DRAWINGS

Reference is now made to the accompanying drawings wherein.

As may be understood from this disclosure and drawings, in its broadest embodiment, this invention provides a process for the upgrading of aluminum mineral bearing materials selected from the group consisting of bauxites, bauxitic clays, and aluminum mineral bearing clays comprising the steps of:

(a) subjecting a pulp of the said material to at least one dispersion stage in the presence of at least sodium hydroxide and in the pH range of about 8.5 to 12.5;

(b) subsequently subjecting the said pulp to at least one screening stage in the range of 10 mesh Tyler to 65 mesh Tyler to produce a minus 10 to minus 65 mesh product;

(c) subsequently subjecting said minus 10 to minus 65 mesh product to at least one stage of high intensity magnetic separation using a field strength of about 11.0 to 22.0 kilogauss to produce a magnetic concentrate enriched in iron and titanium minerals, and a nonmagnetic product impoverished in iron and titanium minerals.

The following description of the drawings sets forth additional details and embodiments of the invention.

DETAILED DESCRIPTION OF THE DRAWINGS

Figure 1:
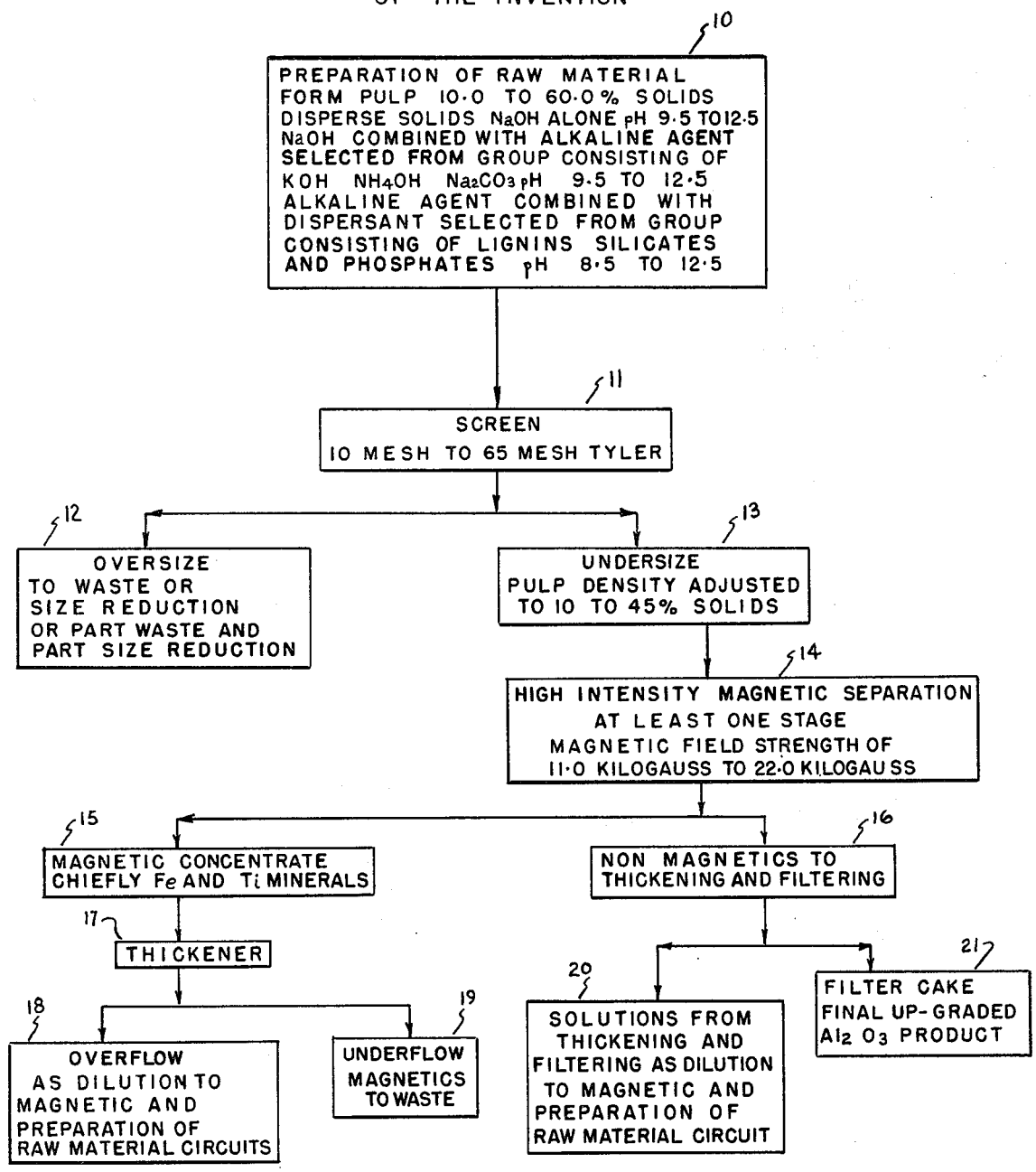
FIG. 1 shows the simplest flow sheet of the invention.

FIG. 1 shows the simplest flow sheet of the invention. The application of this simplest flow sheet is primarily for the removal of iron and titanium minerals from aluminum mineral bearing clays wherein the natural grain size of the constituent minerals is at least finer than 10 mesh. Such material will not require initial preparation, such as crushing. The raw material would normally be fed to a mechanical agitator using a ship type propeller (not shown) in which mill solution or water would be added to form a pulp at numeral 10, within the pulp density range of 10 to 60% solids wherein at least sodium hydroxide would be added and the pH controlled within the range of about 9.5 to 12.5 to obtain dispersion of the contained solids. In one of the preferred embodiments of my invention I prefer to use at least sodium hydroxide as the alkaline agent in combination with a dispersant selected from the group consisting of lignins, silicates and phosphates and in which the pH is controlled within the range of about 8.5 to 12.5.

Following formation of the pulp at this stage, at numeral 11, I screen the material in the range of 10 mesh to 65 mesh Tyler. This screening stage is important in the use of my subsequent stage of high intensity magnetic separation wherein the magnetic gap (not shown), specifically the Jones type magnetic separator, the strength of the magnetic field and the efficiency of the removal of the iron and titanium minerals is dependent upon the width of the magnetic gap used. Thus, my screen size is a function of the high intensity magnetic separator and its efficiency. I have found that the screen size must be so chosen that the maximum sized particle passing through the screen should be at least about 10% less in dimension than the width of the magnetic gap setting. This use of a screen in such a beneficiation circuit is quite contrary to conventional practice where the screen size is normally determined by the liberation characteristics of the valued mineral constituents. This combination of the screen size and the width of the magnetic gap is one of the features of the invention, particularly in combination with the dispersion stage ahead of both the screening and the at least one high intensity magnetic separation stage which allows me to operate both the screening stage and the high intensity magnetic separation stage at pulp densities as high as 45% solids which heretofore, were, to the inventor's knowledge impossible. By being able to operate with such high density, the residence time of the magnetically susceptible iron and titanium minerals have an appreciably longer period of time in the magnetic field then was heretofore possible. By this means the efficiency of my high intensity separation circuit is outstanding.

Numeral 12 shows the oversize from the screening stage either reduced in size by a wet comminution unit, or a portion such as wood, rejected to waste, and the remaining portion ground to minus 10 mesh.

The undersize at 13 may be further diluted to within the range of about 10 to 45% solids, and fed to the at least one stage of high intensity magnetic separation, shown at 14, using a magnetic field strength of 11.0 to 22.0 kilogauss. Following this stage the magnetic concentrate, shown at 15, consisting chiefly of iron and titanium minerals, would normally be fed to a thickener shown at 17, with the thickener overflow at 18 returned as dilution to the magnetic separation and comminution of raw material circuits. The underflow, shown at 19, from the thickener is the magnetic concentrate containing chiefly iron and titanium minerals and would normally be sent to waste.

The nonmagnetics, shown at 16, produced by the at least one stage of high intensity magnetic separation would normally be sent to thickening and filtering with the solutions, shown at numeral 20, from thickening and filtering used as dilution to the magnetic separation and comminution of raw material circuits. The filter cake shown at 21, is the final upgraded aluminum mineral product.

Figure 2:
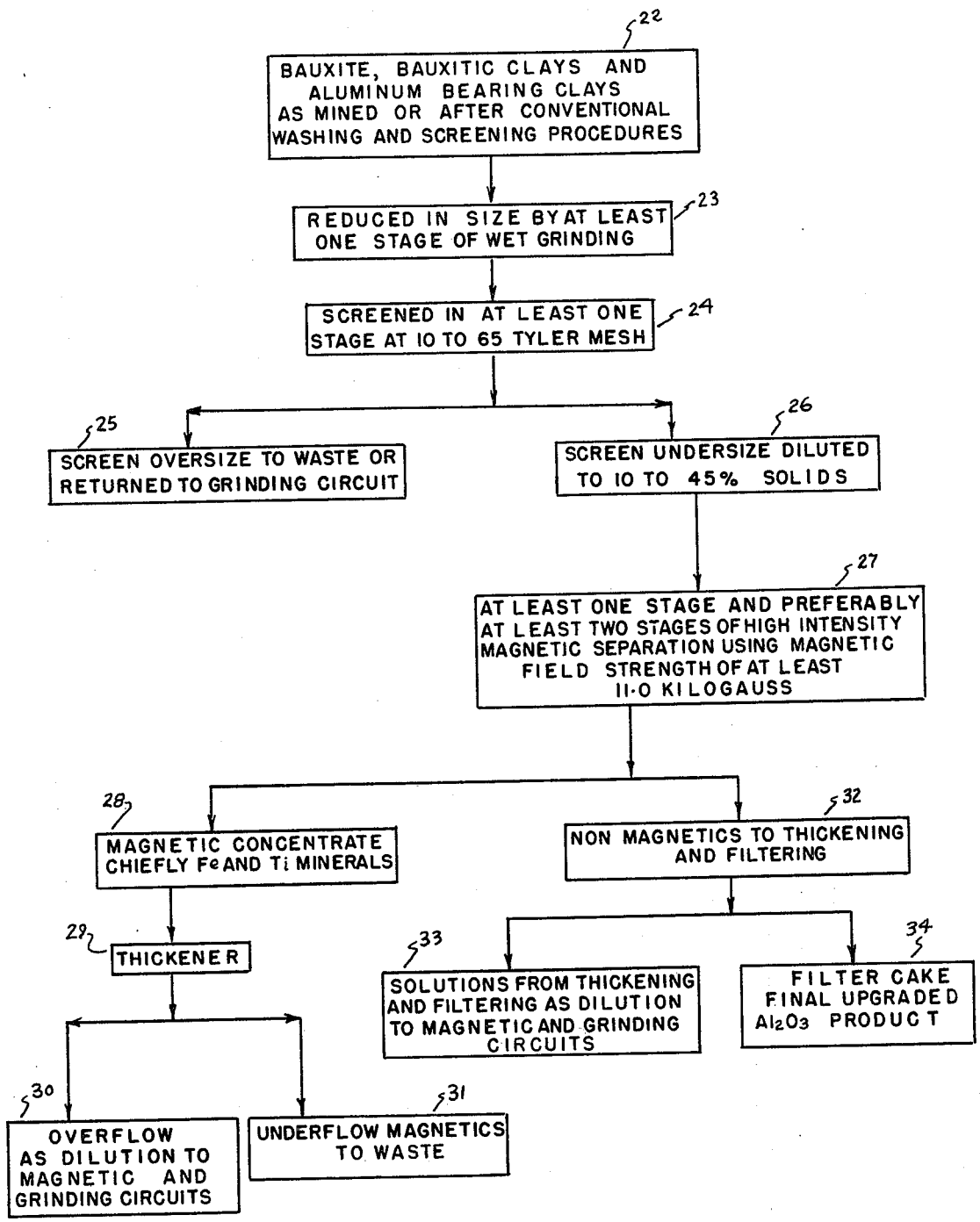
FIG. 2 shows the simplest flow sheet of the invention in the treatment of bauxite, bauxitic clays and aluminum mineral bearing clays incorporating at least one wet grinding stage in the dispersion stage.

FIG. 2 shows the simplest flow sheet of the invention as applied to bauxites, bauxitic clays, and aluminum bearing clays, shown at 22, and as mined or after conventional crushing, and/or washing and screening procedures. Numeral 23 of the flow sheet combines at least one wet grinding stage with dispersion of the solids contained in the pulp. The preferred pulp density of this at least one wet grinding stage is 45 to 55% solids with the minimum being approximately 25% solids and the maximum about 60% solids and in the presence of at least sodium hydroxide with the pH maintained in the range of about 9.5 to 12.5.

Numeral 24 shows the screening stage following the at least one wet grinding stage and numerals 25, 26, 27, 28, 29, 30, 31, 32, 33, and 34 correspond to FIG. 1, numerals 12, 13, 14, 15, 17, 18, 19, 16, 20 and 21, respectively, to result in the final product.

Figure 3:
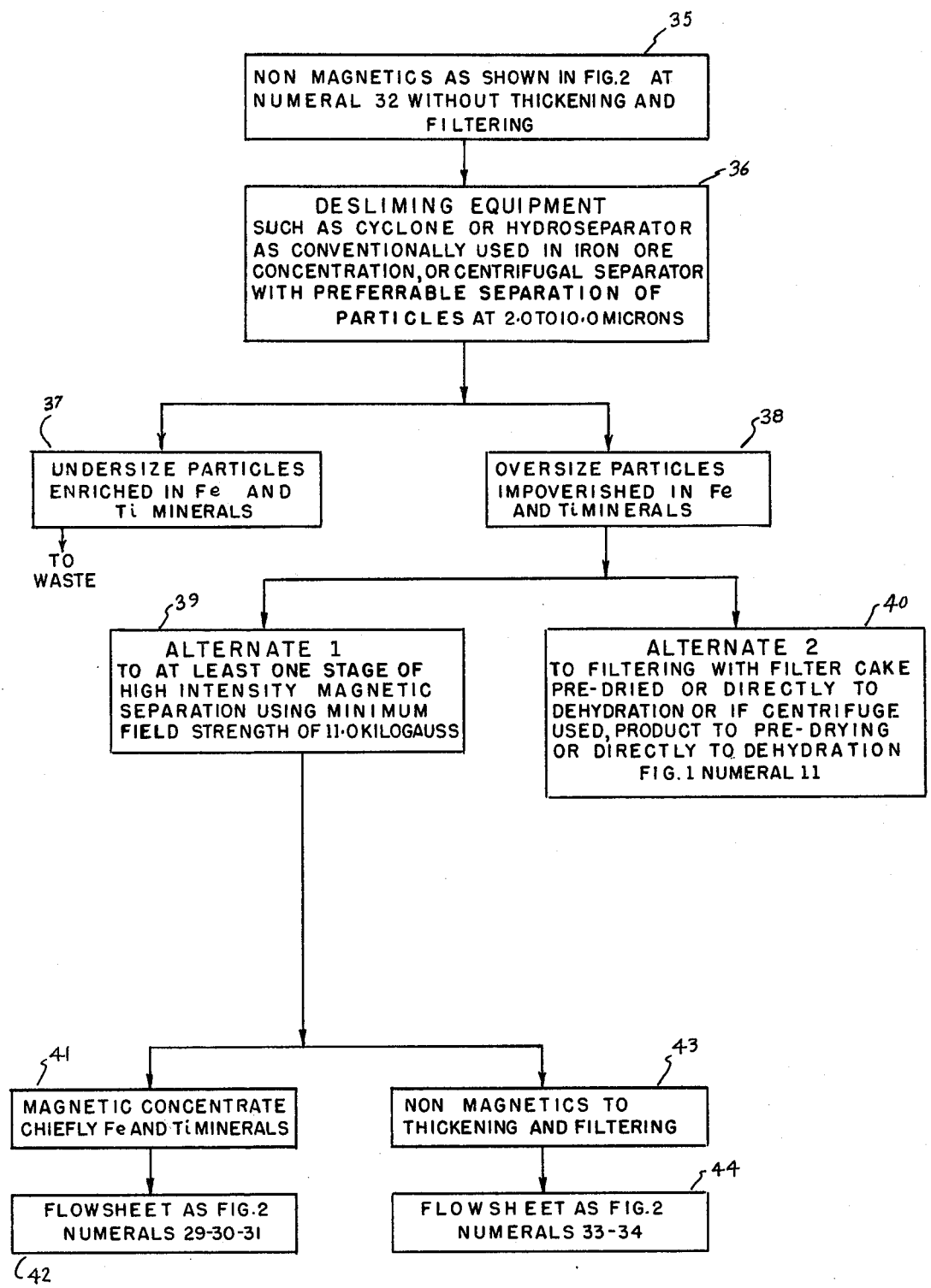
FIG. 3 shows incorporation of the dispersion and grinding stages and shows an additional preferred stage of desliming.

FIG. 3 incorporates all of FIG. 2 to numeral 32 inclusive and without thickening and filtering. From 35, this nonmagnetic product is fed, at numeral 36, to desliming in which preferably the separation is made with conventional equipment, (not shown) and at 2 to 10 microns, and to as coarse as 200 mesh Tyler. The undersize particles from this separation, shown at numeral 37, are enriched in iron and titanium minerals and would normally be sent to waste. The oversize particles, shown at numeral 38, are impoverished in iron and titanium minerals. This product may be treated by either of two alternative procedures. In alternate (1), the oversized particles, shown at 39, are fed to at least one stage of high intensity magnetic separation using a minimum field strength of 11.0 kilogauss with the magnetic concentrate produced, shown at numeral 41, containing chiefly iron and titanium minerals. This product, shown at numeral 42, follows the same flow sheet as FIG. 2, numerals 29, 30 and 31. In alternate (2), the nonmagnetic fraction shown at numeral 43 is normally subjected thickening and filtering and as shown at numeral 44, follows the same flow sheet as FIG. 2, numerals 33, 34.

Figure 4:
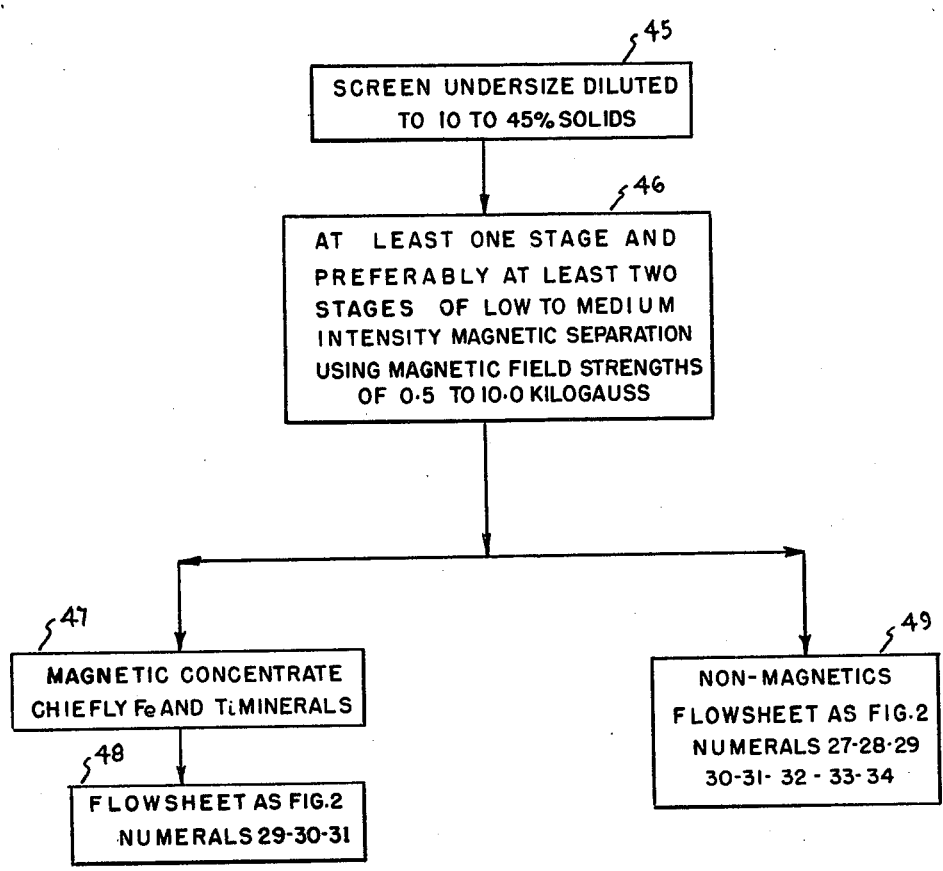
FIG. 4 shows a preferred flow sheet of the invention using the combination of dispersion and wet grinding followed by screening, and after screening, at least one stage of low to medium intensity magnetic separation prior to the use of at least one stage of high intensity magnetic separation.

FIG. 4, as shown at numeral 45, is the screen undersize as shown in FIG. 2, numerals 22, 23, 24, 25 and 26, diluted to about 15 to 45% solids as shown at numeral 46, fed to at least one stage and preferably at least two stages of low to medium intensity magnetic separation using magnetic field strengths of 0.5 to 10.0 kilogauss. The magnetic concentrate produced, as shown at numeral 47, will be chiefly iron and titanium minerals and as shown at numeral 48, will follow the flow sheet as FIG. 2, numerals 29, 30, 31. The nonmagnetic fraction produced, as shown at 49, will follow the flow sheet as FIG. 2, numerals 27, 28, 29, 30, 31, 32, 33 and 34.

The following examples are presented to illustrate the invention, but they are not to be considered as limited thereto. In these examples and throughout the specification, parts are by dry weight unless otherwise indicated.

EXAMPLES OF THE OPERATION OF THE INVENTION

In all of the following examples the ore as received was air dried for ease of handling and put through a hammer mill to produce a product that was approximately minus three quarter inch.

For pilot plant operation this was the feed material to the single stage ball mill grinding circuit that was used.

For laboratory research work the minus ¾ inch product was further reduced to minus 6 mesh for grinding in a single stage laboratory rod or ball mill.

EXAMPLE 1

This example is an illustration of employing a preferred embodiment of my invention in using at least one stage of high intensity magnetic separation.

The feed material was an Arkansas bauxite.

The major components of the pilot plant were a ball mill, followed by a 35 mesh screen, a low intensity drum type magnetic separator, a Jones high intensity magnetic separator with reputed magnetic field strength of 14 to 16 kilogauss, and means for thickening, filtering and materials handling.

The feed rate to the ball mill circuit was 800 pounds per hour on a dry ore basis.

NaOH was used alone as the alkaline agent and throughout all of the tests the pH was maintained at the ball mill discharge between 10.7 to 10.9.

The dispersing agent was added to the feed end of the ball mill.

2080 is a lignin compound supplied by the Rayonier Company, a subsidiary of ITT.

HMP is sodium hexametaphosphate.

Orzan is a trade name of Crown Zellerbach, and is a lignin compound.

Quebracho is a lignin, and a bark extract from South America.

Unless otherwise stated the solution strengths of all reagents used was 2½%, with the exception of NaOH which was a 10% solution.

In all cases the percent solids in the ball mill discharge was controlled at approximately 50% solids, and the % solids to the number one high magnetic intensity stage of the Jones Magnetic Separator was 42 to 44%.

The screen oversize was sent to waste as it contained mainly wood.

The drum type magnetic cobber was of low kilogauss strength and not measured. It removed less than 0.2% of the original feed as magnetic particles.

The Jones Magnetic Separator, supplied by Klockner Humboldt Deutz of Cologne, Germany, had an upper and lower magnetic ring.

In the following tests 2 magnetic cobbing stages were made on the top ring and one magnetic cobbing stage on the lower ring, for a total of three magnetic separation stages.

The following results were obtained with the major variable being the Dispensing Agent.

| Dispersing Agent lbs./Ton | % - Chemical Analysis and % Wt. | | | | | | | |
|---|---|---|---|---|---|---|---|---|
| | Magnetic Concts. | | | | Non Magnetics | | | |
| | $SiO_2$ | $Fe_2O_3$ | $TiO_2$ | % Wt. | $SiO_2$ | $Fe_2O_3$ | $TiO_2$ | % Wt. |
| 2080 3.97 lbs/Ton | 11.0 | 23.7 | 5.2 | 19.2 | 17.8 | 1.69 | 1.35 | 81.8 |
| HMP 1.0 lbs/Ton | 9.3 | 31.2 | 5.4 | 16.7 | 18.0 | 1.85 | 1.50 | 83.3 |
| HMP 1.0 lbs/Ton and Quebracho 0.75 lbs/Ton | 10.4 | 26.9 | 5.5 | 16.1 | 17.9 | 1.67 | 1.45 | 83.9 |
| Quebracho 1.06 lbs/Ton and Orzan 0.61 lbs/Ton | 9.6 | 27.9 | 5.4 | 15.6 | 18.0 | 1.81 | 1.46 | 84.4 |

Note:
Average head analysis was 16.0% $SiO_2$ 6.2% $Fe_2O_3$, and 2.0% $TiO_2$.

EXAMPLE 2

The following pilot plant run was made on an Arkansas Bauxitic Clay using the same circuitry as in Example 1. The major difference was in the % solids to the number one magnetic cobbing stage of the Jones Magnetic separator; this was 19.0% solids.

The Alkaline Agent was NaOH, and the pH in the circuit maintained at 10.7 to 10.8, and the Dispersing Agent was Quebracho used at the rate of 0.5 lbs/ton of ore.

The following results were obtained:

| % Chemical Analysis and % Wt. | | | | | | | |
|---|---|---|---|---|---|---|---|
| Magnetic Concts. | | | | Non Magnetics | | | |
| $SiO_2$ | $Fe_2O_3$ | $TiO_2$ | % Wt. | $SiO_2$ | $Fe_2O_3$ | $TiO_2$ | % Wt. |
| 21.8 | 21.9 | 7.2 | 11.7 | 32.9 | 0.88 | 1.14 | 88.3 |

Note:
Head analysis of feed was 31.5% $SiO_2$, 3.34% $Fe_2O_3$ and 1.99% $TiO_2$.

EXAMPLE 3

This example is an illustration of employing a preferred embodiment of my invention in using at least one stage of high intensity magnetic separation and at least one stage of desliming.

The ore used was a Bauxite from South America which had been conventionally treated by crushing and washing out of the fines.

The head analysis was as follows:

| Chemical Analysis - % | | | |
|---|---|---|---|
| $SiO_2$ | $Fe_2O_3$ | $TiO_2$ | $P_2O_5$ |
| 4.0 | 8.1 | 1.0 | 0.12 |

600 grams of the dried material was ground in a laboratory rod mill at 50% solids with 12 ccs of 10% NaOH and 6 ccs of 2080 for 8.0 minutes. Following the ball mill the pulp was conditioned for 15 minutes in a Wemco cell with the pH adjusted to 12.0 with NaOH and then subjected to two stages of magnetic cobbing in a laboratory size Colburn high intensity magnetic unit. The two magnetic concentrates were cleaned once with the cleaner tailings returned to the non-magnetic portion of the pulp.

The total non-magnetic portion was subjected to a desliming stage using a thickener-sizer as the equipment.

The following results were obtained:

| Product Produced | % Wt. | Chemical Analysis - % | | | |
|---|---|---|---|---|---|
| | | $SiO_2$ | $Fe_2O_3$ | $TiO_2$ | $P_2O_5$ |
| Magnetic Concentrate | 13.7 | 3.90 | 29.3 | 1.52 | |
| Deslime Product Minus 5 microns | 13.6 | 9.40 | 19.7 | 3.20 | |
| Deslime Product Plus 5 microns | 72.7 | 3.15 | 1.39 | 0.53 | 0.003 |
| | 100.0 | | | | |

As in Examples 1 and 2 the excellent metallurgical separation of the iron and titanium minerals with but minor losses in alumina are to be noted. In addition, these are low cost beneficiation steps.

EXAMPLE 4

This example is an illustration of employing a preferred embodiment of my invention in using at least one stage of high magnetic intensity separation prior to desliming, a desliming stage, and finally at least one stage of high magnetic intensity separation following desliming.

The ore used in this example was a Bauxite from Africa and had the following analysis:

| Chemical Analysis - % | | |
|---|---|---|
| $SiO_2$ | $Fe_2O_3$ | $TiO_2$ |
| 1.09 | 6.59 | 2.95 |

600 grams of the material was ground for 5 minutes in a laboratory ball mill at 50% solids and a pH of 10.3 using 8 ccs. of 10% NaOH and 18 ccs. of 2½% Quebracho solution. Following the grinding stage the pulp was transferred to a Wemco cell and conditioned for 5.0 minutes with the pulp pH adjusted to 10.5 with NaOH.

The pulp was then given a single stage high magnetic intensity pass through a Colburn laboratory unit and cleaned once with the cleaner tailings combined with the non-magnetic fraction produced. The total non-magnetics were then deslimed at approximately 5 microns using a laboratory thickener-sizer unit.

The plus 5 micron sized fraction was then diluted to approximately 20% solids and subjected to two passes through the Colburn unit at high magnetic intensity. The two magnetic concentrates were combined and cleaned once with the cleaner tailings combined with the non magnetic fraction.

The following results were obtained:

| Product Produced | % Wt. | Chemical Analysis - % | | |
|---|---|---|---|---|
| | | $SiO_2$ | $Fe_2O_3$ | $TiO_2$ |
| Magnetic Conct. 1 Prior to Desliming | 8.3 | 1.58 | 40.8 | 12.1 |
| Deslime Product Minus 5 microns | 19.8 | 1.42 | 8.8 | 3.5 |
| Magnetic Conct. 2 After Desliming | 5.2 | 0.96 | 11.0 | 4.6 |
| Deslime Product Plus 5 microns | 66.7 | 0.85 | 1.57 | 1.53 |

The Deslime Product Minus 5 microns and the Magnetic Conct. 2 after desliming are suitable feed materials to the Bayer Process, while the Deslime Product plus 5 microns is an outstanding product for use in the chemical or refractory industries.

The magnetic Conct. 1, prior to desliming, would be a waste product.

EXAMPLE 5

This example is a preferred embodiment of my invention using in the beneficiation circuit three stages of high intensity magnetic cobbing in a Jones magnetic separator to produce three magnetic concentrates that were combined and hereafter referred to as "Total Magnetic Concentrate", and a non magnetic product. The non magnetic product was fed to a high efficiency cyclone to produce two products, the "Cyclone Underflow" which was substantially plus 500 Tyler Mesh, and the Cyclone Overflow which in turn was fed to a centrifuge for desliming at approximately 5.0 microns. Two products were produced from the centrifuge, and hereafter referred to as "Centrifuge Minus 5 Microns" and "Centrifuge Plus 5 Microns".

The ore used for this example was a bauxite from South America and was particularly high in iron content.

The ore was treated as mined without the normal screening and washing procedures that eliminates, on a material of this type, about 40% or more as waste.

The beneficiation circuit used was a continuous operating pilot plant involving a single ball mill in which the pulp density was 51% solids, the pH at the mill discharge maintained at 10.7 to 10.8 with NaOH, and 0.6 lbs. Quebracho per dry ton of feed, and 1.0 lbs. Orzan per dry ton feed were added to the ball mill intake.

Following the ball mill, the product was fed to a 28 mesh screen with the oversize, mainly wood, to waste, and the undersize diluted to 28% solids and fed to a Jones High Intensity Magnetic Separator, followed by 2 more passes through the separator. The three magnetic concentrates produced were combined into the "Total Magnetic Concentrate". The nonmagnetic product was fed to a high efficiency cyclone producing a Cyclone Underflow containing about 75% plus 500 mesh and a Cyclone Overflow that was approximately 85% minus 500 mesh.

The Cyclone overflow was fed to a Bird Centrifuge producing an underflow product essentially plus 5 microns and an overflow product essentially minus 5 microns.

The gap setting on the Jones Magnetic Separator was 0.50 to 0.60 millimeters. The screen size preceding the magnetic separator was 35 mesh. When using such a low gap setting the maximum sizing of my screening stage is 28 mesh and preferably 35 to 48 mesh.

The following results were obtained:

| Product Produced | Chemical Analysis - % | | | |
|---|---|---|---|---|
| | % Wt. | SiO$_2$ | Fe$_2$O$_3$ | TiO$_2$ |
| Total Magnetic Concentrate | 18.2 | 6.1 | 48.6 | 1.76 |
| Centrifuge Minus 5 Microns | 15.0 | 19.2 | 28.2 | 5.83 |
| Centrifuge Plus 5 Microns | 27.3 | 3.35 | 6.7 | 1.70 |
| Cyclone Underflow | 39.5 | 2.7 | 2.8 | 0.92 |
| Calculated Heads | 100.0 | 6.1 | 16.0 | 2.0 |

The "Total Magnetic Concentrate" and the "Centrifuge Minus 5 Microns" would be treated as waste.

The "Centrifuge Plus 5 Microns" is excellent feed to the Bayer Process and appreciably higher in recoverable alumina content than conventionally crushed and washed Bauxite that is in planned production from the same geological area.

The "Cyclone Underflow" is an excellent alumina product, and as a fire retardant would be considered a premium product.

The following table shows the complete analysis of the combined cyclone underflow and centrifuge plus 5 micron products with the Al$_2$O$_3$ conventionally calculated.

| % Wt. Recovery | Chemical Analysis - % | | | | |
|---|---|---|---|---|---|
| | Al$_2$O$_3$ | SiO$_2$ | Fe$_2$O$_3$ | TiO$_2$ | L.O.I. |
| 66.8 | 61.3 | 2.9 | 4.4 | 1.2 | 30.2 |

This is outstanding metallurgy with the high grade alumina concentrate produced and a caustic soluble alumina recovery of approximately 90% of the originally contained caustic soluble alumina in the feed sample.

EXAMPLE 6

This example illustrates a preferred embodiment of the invention wherein the raw material was ground in a laboratory rod mill using NaOH in combination with a dispersant; screened at 35 Tyler mesh with the plus 35 mesh being only a trace and discarded and the minus 35 mesh conditioned at a pH of 10.5 using NaOH as the alkaline agent; the pulp was then subjected to three stages of high intensity magnetic separation to produce three magnetic concentrates and a nonmagnetic product containing in excess of 90% of the original aluminum bearing minerals.

The following were the test conditions:

The feed sample was a bauxite from South America and prepared as previously described.

A 600 gram charge was ground in a laboratory rod mill at 50% solids with the addition of 3.0 ccs 10% NaOH solution and 3.0 ccs 2½% Quebracho solution. The pH at the end of grinding was 8.7. The pulp from the rod mill was screened on a 35 Tyler mesh with the plus 35 mesh containing mostly wood and rejected to waste.

The minus 35 mesh was transferred to a Wemco laboratory cell and conditioned for 15 minutes with the pH adjusted to 10.5 with NaOH. The pulp was then subjected to three stages of magnetic separation using a Colburn high intensity magnetic separator.

The following results were obtained:

| Product Produced | Chemical Analysis - % | | | |
|---|---|---|---|---|
| | % Wt. | SiO$_2$ | Fe$_2$O$_3$ | TiO$_2$ |
| Mag. Conct. 1 | 6.3 | 1.2 | 43.1 | 3.0 |
| Mag. Conct. 2 | 2.6 | 2.7 | 13.8 | 2.6 |
| Mag. Conct. 3 | 1.6 | 4.0 | 8.2 | 2.2 |
| Nonmagnetic Product | 89.5 | 3.0 | 1.4 | 1.3 |

EXAMPLE 7

This example illustrates a preferred embodiment of the invention using the same raw material as in Example 6 and duplicating the same circuit with the exception of using 4 ccs 10% NaOH solution to the laboratory rod mill, raising the discharge pH to 10.5, and desliming the nonmagnetic product at about 10 microns using a laboratory thickener-sizer as the desliming equipment.

The following results were obtained with the three magnetic concentrates produced combined and referred to as the magnetic concentrate, i.e., "mag. conct.".

| Product Produced | Chemical Analysis - % | | | |
|---|---|---|---|---|
| | % Wt. | SiO$_2$ | Fe$_2$O$_3$ | TiO$_2$ |
| Mag. Conct. | 10.1 | 1.8 | 31.3 | 2.8 |
| Minus 10 Micron Product | 34.5 | 2.9 | 3.1 | 1.7 |
| Plus 10 Micron Product | 55.4 | 2.7 | 0.8 | 1.2 |

The Mag. Conct., and the Minus 10 Micron Product are satisfactory feed to the Bayer Process and the Plus 10 Micron Product is outstanding and a premium product for use in the refractories industry.

EXAMPLE 8

This example illustrates a preferred embodiment of my invention with high intensity magnetic cobbing prior to desliming and followed by high intensity magnetic cobbing on the coarse fraction produced from the desliming stage.

The ore sample used was a South American bauxite with a high iron content.

A 600 gram prepared sample of the material was ground in a laboratory rod mill at 50% solids and with the addition of 6 ccs 10% NaOH solution and 18 ccs. 2½% Quebracho solution. The pH at the end of grinding was 10.4. The pulp from the rod mill was screened on 35 Tyler mesh with the plus 35 mesh mainly wood particles and rejected as waste. The minus 35 mesh was transferred to a laboratory sized Wembo flotation cell and conditioned for 15 minutes with the pH adjusted to 10.8 with NaOH.

The pulp was then subjected to three stages of high intensity magnetic separation using the Colbourn magnetic separator with the first magnetic concentrate kept separate, and hereafter referred to as mag. conct. 1, and the next two magnetic concentrates combined and hereafter referred to as mag. conct. 2. The nonmagnetic product produced was subjected to desliming at approximately 10 microns using a laboratory thickener-sizer apparatus to produce a plus 10 micron sized product and a minus 10 micron sized product.

The plus 10 micron product was subjected to two stages of high intensity magnetic separation using the Colburn magnetic separator with the two magnetic concentrates produced combined and hereafter referred to as mag. conct. 3, and a final nonmagnetic product.

The following results were obtained:

| Product Produced | % Wt. | Chemical Analysis - % | | | | |
|---|---|---|---|---|---|---|
| | | $Al_2O_3$ | $SiO_2$ | $Fe_2O_3$ | $TiO_2$ | L.O.I. |
| Mag. Conct. 1 | 8.0 | — | 2.4 | 74.8 | 1.5 | — |
| Mag. Conct. 2 | 5.8 | — | 2.5 | 44.9 | 1.9 | — |
| Minus 10 Microns | 25.4 | — | 15.1 | 27.4 | 5.2 | — |
| Mag. Conct. 3 | 2.4 | — | 2.5 | 12.0 | 1.8 | — |
| Nonmagnetics Plus 10 Microns | 58.4 | 63.1 | 1.7 | 1.8 | 0.8 | 32.6 |
| Calculated Head Sample Analysis | 100.0 | 50.7 | 4.2 | 16.9 | 2.1 | 26.1 |

The Mag. Conct. 1, Mag. Conct. 2, and the Minus 10 Micron Products would be treated as waste. Mag. Conct. 3 would be satisfactory feed material to the Bayer Process.

The Nonmagnetics Plus 10 Microns Product is outstanding as a product for use in the chemical industry such as a premium grade fire retardant with a loss on ignition analysis of 32.6% as against a maximum possible of approximately 34.5%.

In one preferred embodiment of the invention, I use one or more stages of desliming following my at least one stage of high intensity magnetic separation. However, dependent on the type of material and the circuitry used I may use one or more stages of desliming at any point in the circuit following my dispersion-grinding stage.

Where I use a low to medium intensity magnetic stage or desliming or both ahead of my at least one high intensity magnetic stage I can use the at least one screening stage at any point in the circuit following the dispersion-grinding stage and prior to the at least one high intensity magnetic stage.

In my one at least high intensity magnetic stage the magnetic gap width is in the range of about 0.35 millimeters to 2.0 millimeters. The width of the gap is determined by measuring the closest distance between opposing ridges of north and south poles and is well understood in the art.

The invention has been described herein with reference to certain preferred embodiments. However, as obvious variations thereon will become apparent to those skilled in the art, the invention is not considered to be limited thereto.

What is claimed is:

1. A process for the upgrading of an aluminum mineral bearing material selected from the group consisting of bauxites and bauxitic clays comprising:
   (a) subjecting said material to at least one stage of wet grinding at a pulp density of about 25% to 60% solids, and in the presence of at least sodium hydroxide, and in the pH range of about 8.5 to 12.5;
   (b) subsequently subjecting the said pulp to at least one screening stage in the range of 10 mesh Tyler to 65 mesh Tyler to produce a minus 10 to minus 65 mesh product, wherein the screen size used in said screening stage is a direct function of the width of the magnetic gap of a high intensity magnetic separation apparatus used in a subsequent at least one stage of high intensity magnetic separation; and wherein such screen size is at least 10% less in dimension than the width of the said magnetic gap setting in the subsequent at least one stage of high intensity magnetic separation;
   (c) subsequently subjecting the said minus 10 to minus 65 mesh product to at least one stage of high intensity magnetic separation using a field strength of about 11.0 to 22.0 kilogauss to produce a magnetic concentrate enriched in iron and titanium ninerals and a nonmagnetic product impoverished in iron and titanium minerals; and
   (d) subsequently subjecting said nonmagnetic product to at least one stage of desliming to produce a fines product enriched in iron, titanium, and silica, and a coarse product impoverished in iron, titanium and silica.

2. A process according to claim 1 wherein the said at least one stage of high intensity magnetic separation is carried out in a magnetic gap type high intensity magnetic separator.

3. A process according to claim 1 wherein the said minus 10 to minus 65 mesh product is subjected to at least two stages of high intensity magnetic separation in a magnetic gap type high intensity magnetic separator.

4. A process according to claim 1 wherein following the said desliming stage, the said coarse product produced is subsequently subjected to at least one stage of high intensity magnetic separation.

5. A process according to claim 4 wherein the said at least one stage of high intensity magnetic separation is carried out in a magnetic gap type high intensity magnetic separator.

6. A process for the upgrading of an aluminum mineral bearing material selected from the group consisting of bauxites and bauxitic clays comprising:
   (a) subjecting said material to at least one stage of wet grinding at a pulp density of about 25% to 60% solids, and in the presence of sodium hydroxide alone and in the pH range of about 9.5 to 12.5;
   (b) subsequently subjecting the said pulp to at least one screening stage in the range of 10 mesh Tyler to 65 mesh Tyler to produce a minus 10 to minus 65 mesh product, wherein the screen size used in said screening stage is a direct function of the width of the magnetic gap of a high intensity magnetic separation apparatus used in a subsequent at least one stage of high intensity magnetic separation; and wherein such screen size is at least 10% less in dimension than the width of the said magnetic gap setting in the subsequent at least one stage of high intensity magnetic separation;
   (c) subsequently subjecting said minus 10 to minus 65 mesh product to at least one stage of high intensity magnetic separation using a field strength of about 11.0 to 22.0 kilogauss to produce a magnetic concentrate enriched in iron and titanium minerals and a nonmagnetic product impoverished in iron and titanium minerals; and
   (d) subsequently subjecting said nonmagnetic product to at least one stage of desliming to produce a fines product enriched in iron, titanium, and silica, and a coarse product impoverished in iron, titanium and silica.

7. A process according to claim 6 wherein the said at least one stage of high intensity magnetic separation is carried out in a magnetic gap type high intensity magnetic separator.

8. A process according to claim 6 wherein the said minus 10 to minus 65 mesh product is subjected to at least two stages of high intensity magnetic separation in a magnetic gap type high intensity magnetic separator.

9. A process according to claim 6 wherein following the said desliming stage, the said coarse product produced is subsequently subjected to at least one stage of high intensity magnetic separation.

10. A process according to claim 9 wherein the said at least one stage of said high intensity magnetic separation is carried out in a magnetic gap type high intensity magnetic separator.

11. A process for the upgrading of an aluminum mineral bearing material selected from the group consisting of bauxites and bauxitic clays comprising:
(a) subjecting said material to at least one stage of wet grinding at a pulp density of about 25% to 60% solids, and in the presence of at least sodium hydroxide, and an alkaline agent selected from the group consisting of KOH, NH$_4$OH, Na$_2$CO$_3$, and mixtures thereof and in the pH range of about 9.5 to 12.5;
(b) subsequently subjecting the said pulp to at least one screening stage in the range of 10 mesh Tyler to 65 mesh Tyler to produce a minus 10 to minus 65 mesh product, wherein the screen size used in said screening stage is a direct function of the width of the magnetic gap of a high intensity magnetic separation apparatus used in a subsequent at least one stage of high intensity magnetic separation; and wherein such screen size is at least 10% less in dimension than the width of the said magnetic gap setting in the subsequent at least one stage of high intensity magnetic separation;
(c) subsequently subjecting said minus 10 to minus 65 mesh product to at least one stage of high intensity magnetic separation using a field strength of about 11.0 to 22.0 kilogauss to produce a magnetic concentrate enriched in iron and titanium minerals and a nonmagnetic product impoverished in iron and titanium minerals; and
(d) subsequently subjecting said nonmagnetic product to at least one stage of desliming to produce a fines product enriched in iron, titanium and silica, and a coarse product impoverished in iron, titanium and silica.

12. A process according to claim 11 wherein the said at least one stage of high intensity magnetic separation is carried out in a magnetic gap type high intensity magnetic separator.

13. A process according to claim 11 wherein the said minus 10 to minus 65 mesh product is subjected to at least two stages of high intensity magnetic separation in a magnetic gap type high intensity magnetic separator.

14. A process according to claim 11 wherein following the said desliming stage, the said coarse product produced is subsequently subjected to at least one stage of high intensity magnetic separation.

15. A process according to claim 14 wherein the said at least one stage of high intensity magnetic separation is carried out in a magnetic gap type high intensity magnetic separator.

16. A process for the upgrading of an aluminum mineral bearing material selected from the group consisting of bauxites and bauxitic clays comprising:
(a) subjecting said material to at least one stage of wet grinding at a pulp density of about 25% to 60% solids, and in the presence of at least sodium hydroxide, in combination with a dispersant selected from the group consisting of lignins, silicates, phosphates, and mixtures thereof, and in the pH range of about 8.5 to 12.5;
(b) subsequently subjecting the said pulp to at least one screening stage in the range of 10 mesh Tyler to 65 mesh Tyler to produce a minus 10 to minus 65 mesh product, wherein the screen size used in said screening stage is a direct function of the width of the magnetic gap of a high intensity magnetic separation apparatus used in a subsequent at least one stage of high intensity magnetic separation; and wherein such screen size is at least 10% less in dimension than the width of the said magnetic gap setting in the subsequent at least one stage of high intensity magnetic separation;
(c) subsequently subjecting said minus 10 to minus 65 mesh product to at least one stage of high intensity magnetic separation using a field strength of about 11.0 to 22.0 kilogauss to produce a magnetic concentrate enriched in iron and titanium minerals and a nonmagnetic product impoverished in iron and titanium minerals; and
(d) subsequently subjecting said nonmagnetic product to at least one stage of desliming to produce a fines product enriched in iron, titanium, and silica, and a coarse product impoverished in iron, titanium, and silica.

17. A process according to claim 16 wherein the said at least one stage of high intensity magnetic separation is carried out in a magnetic gap type high intensity magnetic separator.

18. A process according to claim 16 wherein the said minus 10 to minus 65 mesh product is subjected to at least two stages of high intensity magnetic separation in a magnetic gap type high intensity magnetic separator.

19. A process according to claim 16 wherein following the said desliming stage, the said coarse product produced is subsequently subjected to at least one stage of high intensity magnetic separation.

20. A process according to claim 19 wherein the said at least one stage of high intensity magnetic separation is carried out in a magnetic gap type high intensity magnetic separator.

21. A process for the upgrading of an aluminum mineral bearing material selected from the group consisting of bauxites and bauxitic clays comprising:
(a) subjecting said material to at least one stage of wet grinding at a pulp density of about 25% to 60% solids, and in the presence of at least sodium hydroxide, in combination with an alkaline agent selected from the group consisting of KOH, NH$_4$OH, Na$_2$CO$_3$, and mixtures thereof, and a dispersant selected from the group consisting of lignins, silicates, phosphates, and mixtures thereof and in the pH range of about 8.5 to 12.5;
(b) subsequently subjecting the said pulp to at least one screening stage in the range of 10 mesh Tyler to 65 mesh Tyler to produce a 10 to minus 65 mesh product, wherein the screen size used in said screening stage is a direct function of the width of the magnetic gap of a high intensity magnetic separation apparatus used in a subsequent at least one stage of high intensity magnetic separation; and wherein such screen size is at least 10% less in dimension than the width of the said magnetic gap setting in the subsequent at least one stage of high intensity magnetic separation;

(c) subsequently subjecting said minus 10 to minus 65 mesh product to at least one stage of high intensity magnetic separation using a field strength of about 11.0 to 22.0 kilogauss to produce a magnetic concentrate enriched in iron and titanium minerals and a nonmagnetic product impoverished in iron and titanium minerals; and (d) subsequently subjecting said nonmagnetic product to at least one stage of desliming to produce a fines product enriched in iron, titanium, and silica and a coarse product impoverished in iron, titanium and silica.

22. A process according to claim 21 wherein the said at least one stage of high intensity magnetic separation is carried out in a magnetic gap type high intensity magnetic separator.

23. A process according to claim 21 wherein the said minus 10 to minus 65 mesh product is subjected to at least two stages of high intensity magnetic separation in a magnetic gap type high intensity magnetic separator.

24. A process according to claim 21 wherein following the said desliming stage, the said coarse product produced is subsequently subjected to at least one stage of high intensity magnetic separation.

25. A process according to claim 24 wherein the said at least one stage of high intensity magnetic separation is carried out in a magnetic gap type high intensity magnetic separator.

26. A process for the upgrading of an aluminum mineral bearing material selected from the group consisting of bauxites and bauxitic clays comprising:

(a) subjecting said materials to at least one stage of wet grinding at a pulp density of about 25% to 60% solids, and in the presence of at least sodium hydroxide and in the pH range of about 8.5 to 12.5;

(b) subsequently subjecting the said pulp to at least one screening stage in the range of 10 mesh Tyler to 65 mesh Tyler to produce a minus 10 to minus 65 mesh product, wherein the screen size used in said screening stage is a direct function of the width of the magnetic gap of a high intensity magnetic separation apparatus used in a subsequent at least one stage of high intensity magnetic separation; and wherein such screen size is at least 10% less in dimension than the width of the said magnetic gap setting in the subsequent at least one stage of high intensity magnetic separation;

(c) subsequently subjecting said minus 10 to minus 65 mesh product to at least one stage of low to medium intensity magnetic separation in the range of 0.5 to 10.0 kilogauss to produce a nonmagnetic product;

(d) subsequently subjecting said nonmagnetic product to at least one stage of high intensity magnetic separation using a field strength of about 11.0 to 22.0 kilogauss to produce a magnetic concentrate enriched in iron and titanium minerals and a nonmagnetic product impoverished in iron and titanium minerals; and (e) subsequently subjecting said nonmagnetic product to at least one stage of desliming to produce a fines product enriched in iron, titanium, and silica, and a coarse product impoverished in iron, titanium and silica.

27. A process according to claim 26 wherein the said at least one stage of high intensity magnetic separation is carried out in a magnetic gap type high intensity magnetic separator.

28. A process according to claim 26 wherein the said minus 10 to minus 65 mesh product is subjected to at least two stages of high intensity magnetic separation in a magnetic gap type high intensity magnetic separator.

29. A process according to claim 26 wherein following the said desliming stage, the said coarse product produced is subsequently subjected to at least one stage of high intensity magnetic separation.

30. A process according to claim 29 wherein the said at least one stage of high intensity magnetic separation is carried out in a magnetic gap type high intensity magnetic separator.

31. A process according to claim 26 wherein the said product is subjected to at least one screening stage in the range of 10 mesh Tyler to 65 mesh Tyler to produce a minus 10 to minus 65 mesh product subsequent to the said at least one stage of low to medium intensity magnetic separation.

32. A process according to claim 26 wherein the said non-magnetic product from (d) is subjected to at least two stages of desliming to produce a fines product enriched in iron, titanium, and silica and a coarse product impoverished in iron, titanium and silica.

33. A process according to claim 26 wherein, subsequent to said at least one stage of wet grinding, and prior to said at least one stage of high intensity magnetic separation, the said product is subjected to at least one stage of desliming to produce a fines product enriched in iron, titanium, and silica and a coarse product impoverished in iron, titanium, and silica.

34. A process for the upgrading of an aluminum mineral bearing material selected from the group consisting of bauxites and bauxitic clays comprising:

(a) subjecting said material to at least one stage of wet grinding at a pulp density of about 25% to 60% solids, and in the presence of sodium hydroxide and in the pH range of about 9.5 to 12.5;

(b) subsequently subjecting the said pulp to at least one screening stage in the range of 10 mesh Tyler to 65 mesh Tyler to produce a minus 10 to minus 65 mesh product, wherein the screen size used in said screening stage is a direct function of the width of the magnetic gap of a high intensity magnetic separation apparatus used in a subsequent at least one stage of high intensity magnetic separation; and wherein such screen size is at least 10% less in dimension than the width of the said magnetic gap setting in the subsequent at least one stage of high intensity magnetic separation;

(c) subsequently subjecting said minus 10 to minus 65 mesh product to at least one stage of low to medium intensity magnetic separation in the range of 0.5 to 10.0 kilogauss to produce a nonmagnetic product;

(d) subsequently subjecting said nonmagnetic product to at least one stage of high intensity magnetic separation using a field strength of about 11.0 to 22.0 kilogauss to produce a magnetic concentrate enriched in iron and titanium minerals and a nonmagnetic product impoverished in iron and titanium minerals; and (e) subsequently subjecting said nonmagnetic product to at least one stage of desliming to produce a fines product enriched in iron, titanium and silica, and a coarse product impoverished an iron, titanium and silica.

35. A process according to claim 34 wherein the said at least one stage of high intensity magnetic separation is carried out in a magnetic gap type high intensity magnetic separator.

36. A process according to claim 34 wherein the said minus 10 to minus 65 mesh product is subjected to at least two stages of high intensity magnetic separation in a magnetic gap type high intensity magnetic separator.

37. A process according to claim 34 wherein following the said desliming stage, the said coarse product produced is subsequently subjected to at least one stage of high intensity magnetic separation.

38. A process according to claim 37 wherein the said at least one stage of high intensity magnetic separation is carried out in a magnetic gap type high intensity magnetic separator.

39. A process according to claim 34 wherein the said product is subjected to at least one screening stage in the range of 10 mesh Tyler to 65 mesh Tyler to produce a minus 10 to minus 65 mesh product subsequent to the said at least one stage of low to medium intensity magnetic separation.

40. A process according to claim 34 wherein the said non-magnetic product from (d) is subjected to at least two stages of desliming to produce a fines product enriched in iron, titanium and silica and a coarse product impoverished in iron, titanium and silica.

41. A process according to claim 40 wherein, subsequent to said at least one stage of wet grinding, and prior to said at least one stage of high intensity magnetic separation, the said product is subjected to at least one stage of desliming to produce a fines product enriched in iron, titanium and silica and a coarse product impoverished in iron, titanium and silica.

42. A process for the upgrading of an aluminum mineral bearing material selected from the group consisting of bauxites and buaxitic clays comprising:
(a) subjecting said material to at least one stage of wet grinding at a pulp density of about 25% to 60% solids, and in the presence of at least sodium hydroxide and an alkaline agent selected from the group consisting of KOH, NH4OH, Na2CO3 and mixtures thereof and in the pH range of about 9.2 to 12.5;
(b) subsequently subjecting the said pulp to at least one screening stage in the range of 10 mesh Tyler to 65 mesh Tyler to produce a minus 10 to minus 65 mesh product, wherein the screen size used in said screening stage is a direct function of the width of the magnetic gap of a high intensity magnetic separation apparatus used in a subsequent at least one stage of high intensity magnetic separation; and wherein such screen size is at least 10% less in dimension than the width of the said magnetic gap setting in the subsequent at least one stage of high intensity magnetic separation;
(c) subsequently subjecting said minus 10 to minus 65 mesh product to at least one stage of low to medium intensity magnetic separation in the range of 0.5 to 10.0 kilogauss to produce a nonmagnetic product;
(d) subsequently subjecting said nonmagnetic product to at least one stage of high intensity magnetic separation using a field strength of about 11.0 to 22.0 kilogauss to produce a magnetic concentrate enriched in iron and titanium minerals and a nonmagnetic product impoverished in iron and titanium minerals; and
(e) subsequently subjecting said nonmagnetic product to at least one stage of desliming to produce a fines product enriched in iron, titanium, and silica, and a coarse product impoverished in iron, titanium and silica.

43. A process according to claim 42 wherein the said at least one stage of high intensity magnetic separation is carried out in a magnetic gap type high intensity magnetic separator.

44. A process according to claim 42 wherein the said minus 10 to minus 65 mesh product is subjected to at least two stages of high intensity magnetic separation in a magnetic gap type high intensity magnetic separator.

45. A process according to claim 42 wherein following the said desliming stage, the said coarse product produced is subsequently subjected to at least one stage of high intensity magnetic separation.

46. A process according to claim 45 wherein the said at least one stage of high intensity magnetic separation is carried out in a magnetic type high intensity magnetic separator.

47. A process according to claim 42 wherein the said product is subjected to at least one screening stage in the range of 10 mesh Tyler to 65 mesh Tyler to produce a minus 10 to minus 65 mesh product subsequent to the said at least one stage of low to medium intensity magnetic separation.

48. A process according to claim 42 wherein the said non-magnetic product from (d) is subjected to at least two stages of desliming to produce a fines product enriched in iron, titanium, and silica and a coarse product impoverished in iron, titanium, and silica.

49. A process according to claim 42 wherein, subsequent to said at least one stage of wet grinding, and prior to said at least one stage of high intensity magnetic separation, the said product is subjected to at least one stage of desliming to produce a fines product enriched in iron, titanium, and silica and a coarse product impoverished in iron, titanium and silica.

50. A process for the upgrading of an aluminum mineral bearing material selected from the group consisting of bauxites and bauxitic clays, comprising:
(a) subjecting said material to at least one stage of wet grinding at a pulp density of about 25% to 60% solids, and in the presence of at least sodium hydroxide in combination with a dispersant selected from the group consisting of lignins, silicates, phosphates and mixtures thereof and in the pH range of about 8.5 to 12.5;
(b) subsequently subjected and said pulp to at least one screening stage in the range of 10 mesh Tyler to 65 mesh Tyler to produce a minus 10 to minus 65 mesh product, wherein the screen size used in said screening stage is a direct function of the width of the magnetic gap of a high intensity magnetic separation apparatus used in a subsequent at least one stage of high intensity magnetic separation; and wherein such screen size is at least 10% less in dimension than the width of the said magnetic gap setting in the subsequent at least one stage of high intensity magnetic separation;
(c) subsequently subjecting said minus 10 to minus 65 mesh product to at least one stage of low to medium intensity magnetic separation in the range of 0.5 to 10.0 kilogauss to produce a nonmagnetic product;
(d) subsequently subjecting said nonmagnetic product to at least one stage of high intensity magnetic separation using a field strength of about 11.0 to 22.0 kilogauss to produce a magnetic concentrate enriched in iron and titanium minerals and a nonmagnetic product impoverished in iron and titanium minerals; and (e) subsequently subjecting said nonmagnetic product to at least one stage of desliming to produce a fines product enriched in iron, titanium and silica, and a coarse product impoverished in iron, titanium and silica.

51. A process according to claim 50 wherein the said at least one stage of high intensity magnetic separation is carried out in a magnetic gap type high intensity magnetic separator.

52. A process according to claim 50 wherein the said minus 10 to minus 65 mesh product is subjected to at least two stages of high intensity magnetic separation in a magnetic gap type high intensity magnetic separator.

53. A process according to claim 50 wherein following the said desliming stage, the said coarse product produced is subsequently subjected to at least one stage of high intensity magnetic separation.

54. A process according to claim 53 wherein the said at least one stage of high intensity magnetic separation is carried out in a magnetic gap type high intensity magnetic separator.

55. A process according to claim 50 wherein the said product is subjected to at least one screening stage in the range of 10 mesh Tyler to 65 mesh Tyler to produce a minus 10 to minus 65 mesh product subsequent to the said at least one stage of low to medium intensity magnetic separation.

56. A process according to claim 50 wherein the said non-magnetic product is subjected to at least two stages of desliming to produce a fines produt enriched in iron, titanium and silica, and a coarse product impoverished in iron, titanium and silica.

57. A process according to claim 50 wherein, subsequent to said at least one stage of wet grinding, and prior to said at least one stage of high intensity magnetic separation, the said product is subjected to at least one stage of desliming to produce a fines product enriched in iron, titanium and silica, and a coarse product impoverished in iron, titanium and silica.

58. A process for the upgrading of an aluminum mineral bearing material selected from the group consisting of bauxites and bauxitic clays, comprising:

(a) subjecting said material to at least one stage of wet grinding at a pulp density of about 25% to 60% solids, and in the presence of at least sodium hydroxide in combination with an alkaline agent selected from the group consisting of KOH, NH$_4$OH, Na$_2$CO$_3$, and mixtures thereof, and a dispersant selected from the group consisting of lignins, silicates, phosphates and mixtures thereof, and in the pH range of about 8.5 to 12.5;

(b) subsequently subjecting the said pulp to at least one screening stage in the range of 10 mesh Tyler to 65 mesh Tyler to produce a minus 10 to minus 65 mesh product, wherein the screen size used in said screening stage is a direct function of the width of the magnetic gap of a high intensity magnetic separation apparatus used in a subsequent at least one stage of high intensity magnetic separation; and wherein such screen size is at least 10% less in dimension than the width of the said magnetic gap setting in the subsequent at least one stage of high intensity magnetic separation;

(c) subsequently subjecting said minus 10 to minus 65 mesh product to at least one stage of low to medium intensity magnetic separation in the range of 0.5 to 10.0 kilogauss to produce a nonmagnetic product;

(d) subsequently subjecting said nonmagnetic product to at least one stage of high intensity magnetic separation using a field strength of about 11.0 to 22.0 kilogauss to produce a magnetic concentrate enriched in iron and titanium minerals and a nonmagnetic product impoverished in iron and titanium minerals; and (e) subsequently subjecting said nonmagnetic product to at least one stage of desliming to produce a fines product enriched in iron, titanium and silica, and a coarse product impoverished in iron, titanium and silica.

59. A process according to claim 58 wherein the said at least one stage of high intensity magnetic separation is carried out in a magnetic gap type high intensity magnetic separator.

60. A process according to claim 58 wherein the said minus 10 to minus 65 mesh product is subjected to at least two stages of high intensity magnetic separation in a magnetic gap type high intensity magnetic separator.

61. A process according to claim 58 wherein following the said desliming stage, the said coarse product produced is subsequently subjected to at least one stage of high intensity magnetic separation.

62. A process according to claim 61 wherein the said at least one stage of high intensity magnetic separation is carried out in a magnetic gap type high intensity magnetic separator.

63. A process according to claim 58 wherein the said product is subjected to at least one screening stage in the range of 10 mesh Tyler to 65 mesh Tyler to produce a minus 10 to minus 65 mesh product subsequent to the said at least one stage of low to medium intensity magnetic separation.

64. A process according to claim 58 wherein the said non-magnetic product from (d) is subjected to at least two stages of desliming to produce a fines product enriched in iron, titanium and silica and a coarse product impoverished in iron, titanium and silica.

65. A process according to claim 58 wherein, subsequent to said at least one stage of wet grinding, and prior to said at least one stage of high intensity magnetic separation, the said product is subjected to at least one stage of desliming to produce a fines product enriched in iron, titanium and silica, and a coarse product impoverished in iron, titanium and silica.

* * * * *